(12) United States Patent
Shikata et al.

(10) Patent No.: US 7,677,265 B2
(45) Date of Patent: Mar. 16, 2010

(54) FLUID CONTROL APPARATUS WITH HEATING APPARATUS

(75) Inventors: Izuru Shikata, Osaka (JP); Shigeaki Tanaka, Osaka (JP); Michio Yamaji, Osaka (JP)

(73) Assignee: Fujikin Incorporated, Osaka-shi (JP)

( * ) Notice: Subject to any disclaimer, the term of this patent is extended or adjusted under 35 U.S.C. 154(b) by 331 days.

(21) Appl. No.: 10/556,552

(22) PCT Filed: Apr. 19, 2004

(86) PCT No.: PCT/JP2004/005549

§ 371 (c)(1),
(2), (4) Date: Jan. 12, 2007

(87) PCT Pub. No.: WO2004/102054

PCT Pub. Date: Nov. 25, 2004

(65) Prior Publication Data

US 2007/0169819 A1  Jul. 26, 2007

(30) Foreign Application Priority Data

May 14, 2003 (JP) ............................. 2003-135541

(51) Int. Cl.
*F16K 49/00* (2006.01)
(52) U.S. Cl. ...................... 137/341; 137/884
(58) Field of Classification Search .................. 137/341, 137/884; 118/724, 725; 248/222.12
See application file for complete search history.

(56) References Cited

U.S. PATENT DOCUMENTS

| | | | | |
|---|---|---|---|---|
| 2,819,858 A | * | 1/1958 | Mittendorf | 248/74.2 |
| 3,733,459 A | * | 5/1973 | Lengstorf | 219/201 |
| 3,973,585 A | | 8/1976 | Henderson | 137/340 |
| 4,792,659 A | * | 12/1988 | Thomas | 219/201 |
| 5,413,139 A | * | 5/1995 | Kusumoto et al. | 137/341 |
| 5,488,925 A | * | 2/1996 | Kumada | 118/715 |
| 5,771,919 A | * | 6/1998 | Itoi et al. | 137/454.6 |
| 5,983,933 A | * | 11/1999 | Ohmi et al. | 137/597 |
| 5,988,217 A | * | 11/1999 | Ohmi et al. | 137/614.2 |
| 6,014,498 A | * | 1/2000 | Ikeda et al. | 392/479 |

(Continued)

FOREIGN PATENT DOCUMENTS

JP     10-299943     11/1998

(Continued)

OTHER PUBLICATIONS

Patent Abstracts of Japan vol. 1999, No. 02, Feb. 26, 1999 & JP 10 299943 A (FUJIKIN:KK), Nov. 13, 1998 abstract.

(Continued)

*Primary Examiner*—John Fox
(74) *Attorney, Agent, or Firm*—Kratz, Quintos & Hanson, LLP

(57) ABSTRACT

A heating apparatus (11) has sheet heaters (12) arranged in both sides of at least one line and heating fluid control devices (2, 3, 4) and joint members (5), heat insulating boards (13, 14) made of an engineering plastic are respectively brought into contact with outer sides of the sheet heaters (12), and the heat insulating boards (13, 14) are coupled to each other by at least one thread member (15), whereby the sheet heater (12) is prevented from dropping out.

4 Claims, 2 Drawing Sheets

U.S. PATENT DOCUMENTS

| | | | | |
|---|---|---|---|---|
| 6,039,360 | A | * | 3/2000 | Ohmi et al. ............... 285/61 |
| 6,060,691 | A | * | 5/2000 | Minami et al. ............ 219/201 |
| 6,076,543 | A | * | 6/2000 | Johnson ................. 137/15.17 |
| 6,116,282 | A | * | 9/2000 | Yamaji et al. ............. 137/884 |
| 6,116,283 | A | * | 9/2000 | Yamaji et al. ............. 137/884 |
| 6,152,175 | A | * | 11/2000 | Itoh et al. ................. 137/602 |
| 6,273,139 | B1 | * | 8/2001 | Ohmi et al. ............... 137/884 |
| 6,382,238 | B2 | * | 5/2002 | Ishii et al. ................. 137/271 |
| 6,554,020 | B2 | * | 4/2003 | Yamaji et al. ............. 137/341 |
| 2001/0020488 | A1 | * | 9/2001 | Ishii et al. ................. 137/271 |
| 2002/0038672 | A1 | * | 4/2002 | Tsourides ................. 137/884 |
| 2003/0005959 | A1 | * | 1/2003 | Yamaji et al. ............. 137/341 |
| 2005/0229972 | A1 | * | 10/2005 | Hoshi et al. ............... 137/341 |

FOREIGN PATENT DOCUMENTS

| | | |
|---|---|---|
| JP | 2002-267100 | 9/2002 |
| JP | 2003-21262 | 1/2003 |

OTHER PUBLICATIONS

Patent Abstracts of Japan vol. 016, No. 262 (M-1265), Jun. 15, 1992 & JP 04 064788 A (FUJIKIN:KK), Feb. 28, 1992 abstract.

Supplementary European Search Report of Apr. 4, 2006.

* cited by examiner

FLUID CONTROL APPARATUS WITH HEATING APPARATUS

TECHNICAL FIELD

The present invention relates to a fluid control apparatus used in a semiconductor manufacturing apparatus or the like, and more particularly to a fluid control apparatus with a heating apparatus.

BACKGROUND ART

A fluid control apparatus used in a semiconductor manufacturing apparatus is structured such that various fluid control devices are arranged in plural lines, and flow paths of the fluid control devices in adjacent lines are connected at a predetermined position by a device connecting means. In recent years, however, this kind of fluid control apparatus has been made progressively integrated by connecting a mass flow controller, an opening and closing valve and the like without any tube.

In this kind of fluid control apparatus, there is a case that a heating apparatus is required for the purpose of such as condensation prevention and reliquefaction prevention at a time of gasifying a fluid, which is a liquid at room temperature, so as to flow. As this type of fluid control-apparatus with a heating apparatus, a structure in which right and left tape heaters are arranged as the fluid control apparatus with the heating apparatus mentioned above in both sides of at least one line, and the right and left tape heaters are held to corresponding joint members by a plurality of metal clips has been disclosed (Japanese Unexamined Patent Publication No. 2002-267100).

In accordance with the conventional fluid control apparatus with the heating apparatus mentioned above, there is an advantage that an increase of an installation area due to an addition of the heating apparatus may be inhibited. However, it is not possible to sufficiently bring the heater into close contact with a fluid control device main body or the like, only with an elastic force by the clips. Accordingly, there is a case that a heating capacity comes short with respect to a required temperature, for example, a case that it is possible to heat to about 50° C. but it is not possible to heat to 80° C. or more. Although a structure in which a silicone sponge is adhered as a heat insulating material to the heater and the heater is pinched on the silicone sponge by the clips may also be conceived, there is a problem in this case that an increase in the thickness of the heater including the silicone sponge makes the heater not suitable to be used in the fluid control apparatus in which the integration mentioned above is required. It is of course possible to increase a power of the heater so as to increase a heating capacity. However, in this case, there is a problem that an electric power consumption increases, and economical and energy losses are caused.

An object of the present invention is to provide a fluid control apparatus with a heating apparatus which improves a heating capacity as well as inhibiting an increase of an installation area due to an addition of a heating apparatus.

DISCLOSURE OF THE INVENTION

A fluid control apparatus with a heating apparatus in accordance with the invention is such that a fluid control apparatus with a heating apparatus in which the heating apparatus is provided in the fluid control apparatus structured such that lines formed by a plurality of fluid control devices arranged in an upper stage and a plurality of block-like joint members arranged in a lower stage are arranged in parallel in a base member, characterized in that sheet heaters are arranged in both sides of at least one line, heat insulating boards are respectively brought into contact with outer sides of the sheet heaters, and the heat insulating boards are coupled to each other by at least one thread member, whereby the sheet heater is prevented from dropping out.

A material of the heat insulating board preferably employs a material which is excellent in a heat resisting property and a heat insulating property, and is made, for example, of an engineering plastic. A coefficient of thermal conductivity of the heat insulating board is preferably equal to or less than 1.0 (W/m·K), and more preferably equal to or less than 0.30 (W/m·K).

In accordance with the fluid control apparatus of the invention, since the sheet heaters are arranged in both sides of the line requiring a heat application, the heat insulating boards are respectively brought into contact with the outer sides of the sheet heaters, and the heat insulating boards are coupled to each other by the thread member, it is possible to inhibit an increase of an installation area due to the addition of the heating apparatus, and it is possible to heat a desired line by a little labor hour. Further, since a coefficient of thermal conductivity of the heat insulating board made of the engineering plastic is smaller in comparison with the metal clip (a coefficient of thermal conductivity of a stainless steel is 16.3 W/m·K), it is possible to heat the line to a higher temperature on the basis of a heat insulating effect even in the case that the same heater is used.

It is preferable that an upper portion of each of the heat insulating boards is provided with at least one protruding portion extending in a direction of the other heat insulating board, and leading ends of the protruding portions are confronted with each other, and it is more preferable that a bolt insertion hole inserting and passing a coupling bolt is provided in the protruding portion of one heat insulating board, and a female thread portion with which the coupling bolt is screwed is provided in the protruding portion of the other heat insulating board, respectively.

In accordance with the structure mentioned above, an interval between the heat insulating boards is kept constant, and it is possible to easily execute a screw coupling work.

BEST MODE FOR CARRYING OUT THE INVENTION

A description will be given below of an embodiment in accordance with the invention with reference to the accompanying drawings.

Figure 1:
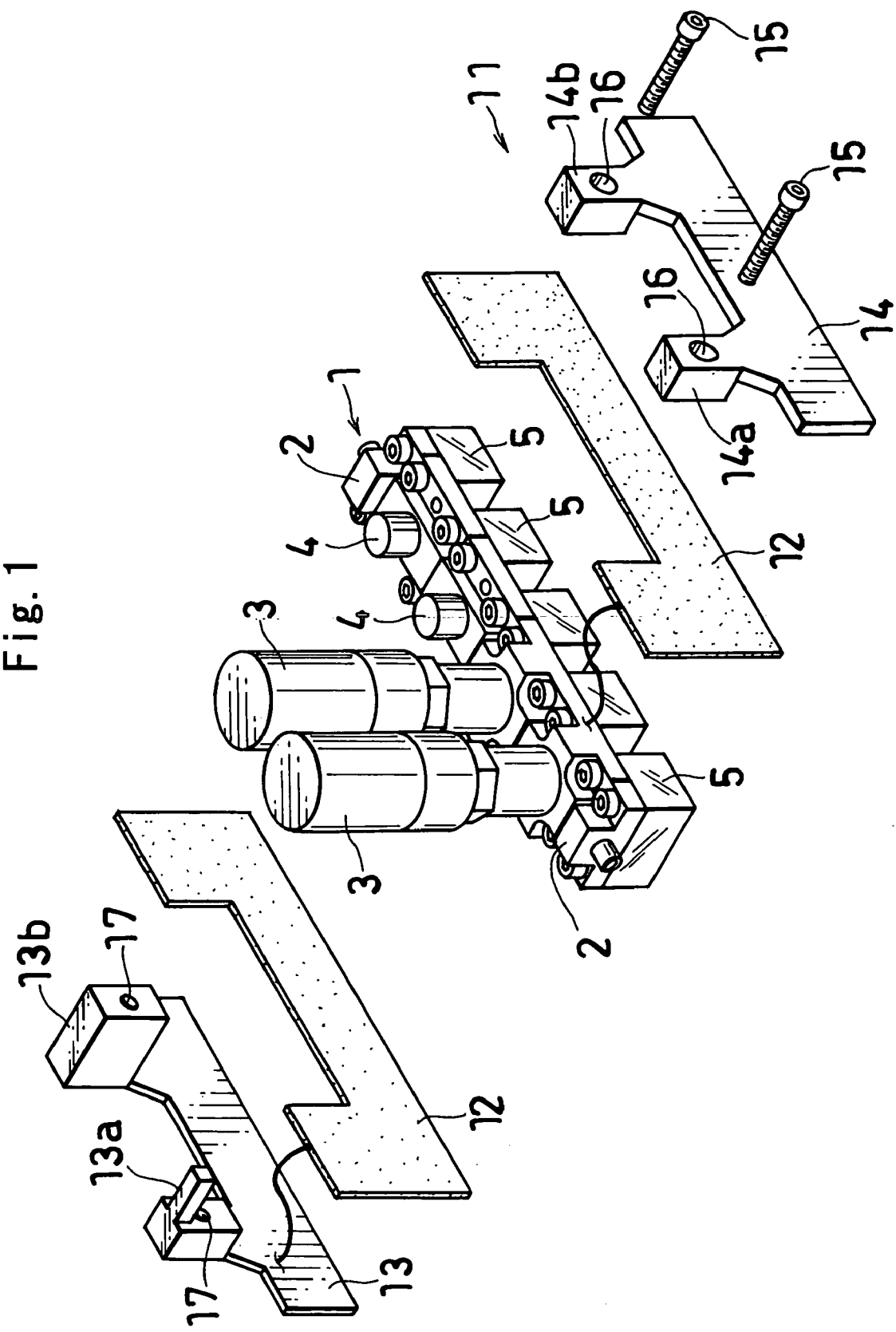
FIG. 1 is an exploded perspective view showing a fluid control apparatus with a heating apparatus in accordance with the invention.
Figure 2:
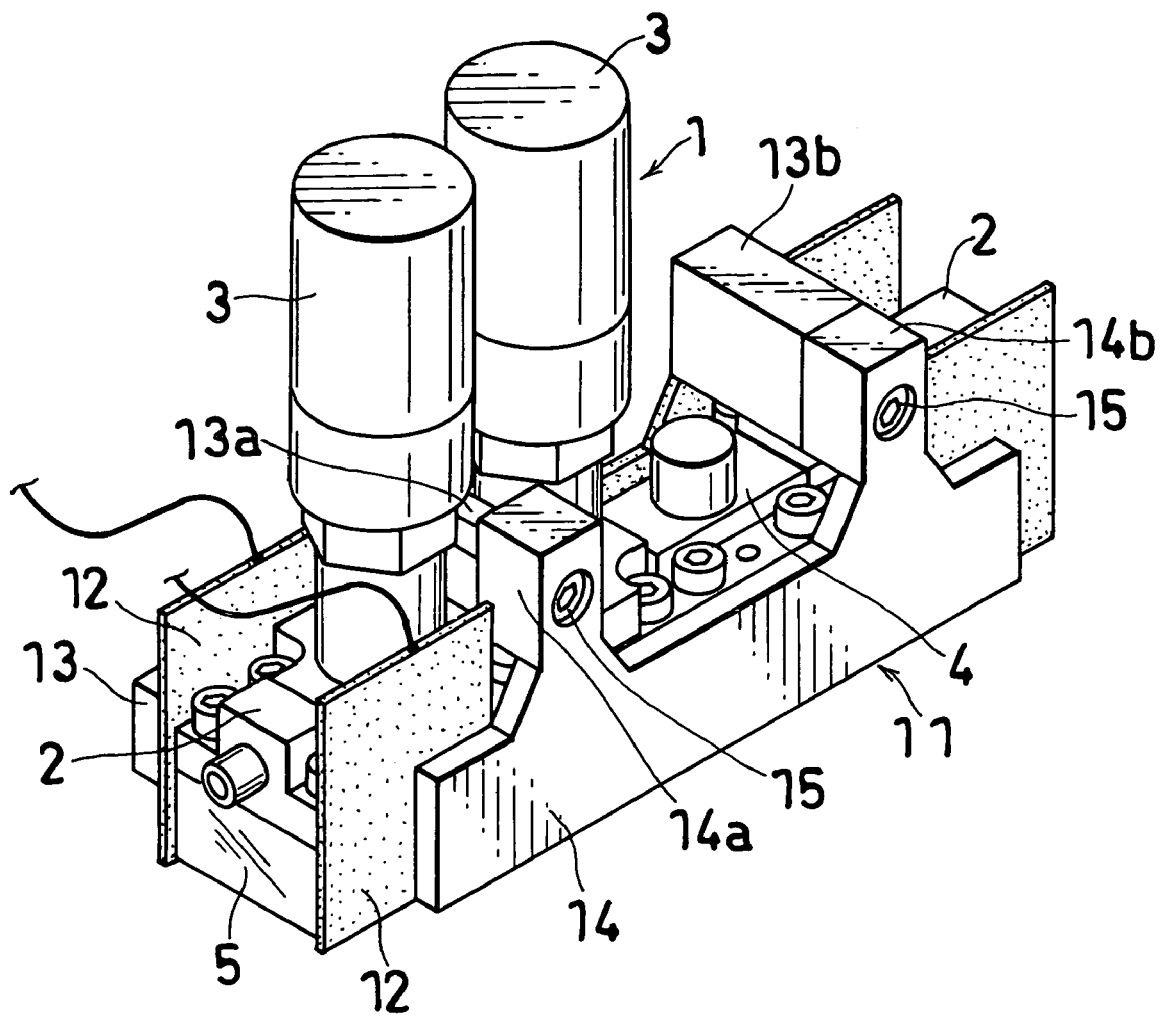
FIG. 2 is a perspective view of the fluid control apparatus with the heating apparatus in accordance with the invention.

FIGS. 1 and 2 show a part of a fluid control apparatus with a heating apparatus in accordance with the invention. A fluid control apparatus 1 is formed such that lines formed by a plurality of fluid control devices 2, 3 and 4 arranged in an upper stage and a plurality of block-like joint members 5 arranged in a lower stage are arranged in parallel in a base member (not shown).

A heating apparatus 11 has sheet heaters 12 arranged in both right and left sides of at least one line and heating the fluid control devices 2, 3 and 4 and the joint members 5, left and right heat insulating boards 13 and 14 made of an engineering plastic are brought into contact with left and right outer sides of the sheet heaters 12, and the left and right heat insulating boards 13 and 14 facing to each other are coupled by two bolts (at least one thread member) 15 with a hexagonal hole, whereby the sheet heater 12 is prevented from dropping out from the fluid control devices 2, 3 and 4 and the joint members 5.

In the sheet heater 12, a height of a center portion is set to a height which can cover main bodies of the fluid control devices 2, 3 and 4 and an entire of the joint members 5, both end portion thereof is made higher than the center portion, and an entire is formed in an approximately-U shape. A shape of the sheet heater is not limited to the approximately-U shape, but may be of course in a band shape in which a height is fixed.

The left and right heat insulating boards 13 and 14 are set to approximately the same height as the height of the center portion of the sheet heater 12, and a portion near both end portions is protruded to an upper side. Upper protruding portions thereof are respectively provided with protruding portions 13a, 13b, 14a and 14b extending in a direction of the other heat insulating boards 13 and 14, and leadings ends of the protruding portions 13a, 13b, 14a and 14b are confronted with each other. The protruding portions 13a and 13b of the left heat insulating board 13 have a larger protruding amount than that of the protruding portions 14a and 14b of the right heat insulating board 13.

Each of the protruding portions 13a, 13b, 14a and 14b is received by upper surfaces of the main bodies of the fluid control devices 2, 3 and 4. One protruding portions 13a and 14a of the protruding portions 13a, 13b, 14a and 14b are arranged between the higher fluid control devices 3, and the other protruding portions 13b and 14b are arranged between the lower fluid control devices 4. The protruding portion 13a of the left heat insulating board 13 arranged between the higher fluid control devices 3 is formed in a shape obtained by partly notching the other protruding portion 13b of the left heat insulating board 13 in order to avoid an interference with the fluid control device 3.

As shown in FIG. 1, the protruding portions 14a and 14b of the right heat insulating boards 14 are provided with a bolt insertion hole 16 for inserting a coupling bolt 15, and the protruding portions 13a and 13b of the left heat insulating board 13 are provided with a female thread portion 17 with which the coupling bolt 15 is screwed, respectively.

In accordance with the structure mentioned above, a kind of the engineering plastic forming the heat insulating boards 13 and 14 is not particularly limited, however, it is preferable that a coefficient of thermal conductivity thereof is equal to or less than 0.30 (W/m·K), and there can be exemplified a PEEK in which a coefficient of thermal conductivity is 0.25 (W/m·K), a ULTEM in which a coefficient of thermal conductivity is 0.22 (W/m·K), an MC nylon in which a coefficient of thermal conductivity is 0.18 (W/m·K) and the like. In this case, a material forming the heat insulating boards 13 and 14 may be of course constituted by the other material than the engineering plastic, however, a coefficient of thermal conductivity in this case is set to be equal to or less than 1.0 (W/m·K), is more preferably set to be equal to or less than 0.30 (W/m·K).

INDUSTRIAL APPLICABILITY

Because the increase of the installation area due to the addition of the heating apparatus may be inhibited and the heating capacity may be improved, it is possible to provide a fluid control apparatus, used in such as a semiconductor manufacturing apparatus, capable of preventing the condensation and the reliquefaction at a time of gasifying the fluid corresponding to the liquid at the room temperature so as to flow, or the like, and having a high performance and a high general-purpose property.

The invention claimed is:

1. A fluid control apparatus with a heating apparatus in which the heating apparatus is provided in the fluid control apparatus structured such that lines formed by a plurality of fluid control devices arranged in an upper stage and a plurality of block-like joint members arranged in a lower stage are arranged in parallel in a base member, characterized in that
the heating apparatus has sheet heaters, having inner sides facing the joint member and opposed outer sides, arranged in both sides of at least one line and heating the fluid control devices and the joint members, heat insulating boards, each of which is composed of a single piece of a single material, are respectively brought into direct contact with the outer sides of the sheet heaters, and the heat insulating boards are coupled to each other by at least one thread member, whereby the sheet heater is prevented from dropping out by being sandwiched between solely the joint members and heat insulating boards, and wherein
a coefficient of thermal conductivity of the heat insulating board is equal to or less than 0.30 (W/m·K).

2. A fluid control apparatus with a heating apparatus according to claim 1, wherein
an upper portion of each of the heat insulating boards is provided with at least one protruding portion extending in a direction of the other heat insulating board, and leading ends of the at least one protruding portion are confronted with each other.

3. A fluid control apparatus with a heating apparatus according to claim 2, wherein
a bolt insertion hole inserting and passing a coupling bolt is provided in the protruding portion of one heat insulating board, and a female thread portion with which the coupling bolt is screwed is provided in the protruding portion of the other heat insulating board, respectively.

4. A fluid control apparatus with a heating apparatus according to one of claim 1 to 3, wherein
the heat insulating board is made of an engineering plastic.

* * * * *